United States Patent Office
3,637,817
Patented Jan. 25, 1972

3,637,817
PRODUCTION OF ETHERS AND ESTERS OF 4-HYDROXYTIGLALDEHYDE
Horst Pommer, Ludwigshafen (Rhine), Herbert Mueller, Frankenthal, Dietrich Mangold, Neckargemund, and Christof Palm, Mannheim, Germany, assignors to Badische Anilin- & Soda-Fabrik Aktiengesellschaft, Ludwigshafen (Rhine), Germany
No Drawing. Filed Oct. 18, 1968, Ser. No. 768,927
Claims priority, application Germany, Oct. 21, 1967, P 16 43 681.0
Int. Cl. C07c 45/00, 67/00
U.S. Cl. 260—491                 10 Claims

ABSTRACT OF THE DISCLOSURE

The production of ethers and esters of 4-hydroxytiglaldehyde by oxidation of ethers or estesr of 3-methyl-but-2-en-1-ol with oxygen or gas containing oxygen in liquid phase at temperatures of 20° to 200° C. in the presence of catalytic amounts of heavy metal salts and bromine or bromine compounds. The products of the process are important compounds for organic syntheses, particularly for the production of carotenoids.

---

The present invention relates to a new process for the production of ethers or esters of 4-hydroxytiglaldehyde (2-methyl-but-2-en-1-al-4-ol).

It is known that the acetic acid ester of 4-hydroxytiglaldehyde, which is important for organic syntheses, can be prepared from 1-chloro-2-methyl-4-acetoxybut-2-ene and hexamethylenetetramine (British patent specification No. 736,488).

However, this method is very troublesome and protracted and only results in unsatisfactory yields.

It is therefore the object of the present invention to make 4-hydroxytiglaldehyde (which is important for organic syntheses) more readily accessible industrially and economically.

We have now found a new process for the production of ethers and esters of 4-hydroxytiglaldehyde which comprises oxidizing an ether or ester of 3-methylbut-2-en-1-ol in the liquid phase with oxygen or a gas containing oxygen at a temperature of from 20° to 200° C. in the presence of a catalytic amount of a heavy metal salt and bromine or a bromine compound.

The starting compounds for the process according to this invention (the ethers and esters of 3-methylbut-2-en-1-ol) are known or are obtainable in known manner by etherification or esterification of 3-methylbut-2-en-1-ol.

Apart from the requirement that the ether or ester radical in the starting compound should not be very susceptible to oxidation under the process conditions, these radicals may be any radicals because they do not take any part in the reaction according to the invention.

Radicals of aliphatic, cycloaliphatic, araliphatic and aromatic alcohols and carboxylic acids are therefore suitable as ether and ester radicals. Among these, hydrocarbon radicals having one to eighteen carbon atoms have special industrial importance as regards further use of the products of the process for organic syntheses.

Salts of metals capable of existing in more than one stage of oxidation, particularly of elements of subgroups 5 to 8 of the Periodic System such as vanadium, chromium, molybdenum, tungsten, manganese, iron and cobalt, and moreover for example of tin and cerium and also mixtures of salts of different metals are generally suitable as heavy metal salts. Salts of manganese and cobalt are preferred.

Since the determining factor is only the heavy metal, and not the remaining composition of the salt, any heavy metal salts may be used, for example oxides, (which may be regarded in this case as salts) halides, sulfates, nitrates and phosphates, and also salts in which the heavy metal is present as the anion, as for example in vanadates, chromates and manganates, or in complex salts such as cyanoferrates and cyanocobaltates. Those salts which dissolve in the reaction mixture are preferred. Usually these are fatty acid salts such as acetates, palmitates or stearates.

In addition to heavy metal salts, the catalysts to be used according to this invention also contain as cocatalysts bromine or bromine compounds such as hydrogen bromide, alkali metal bromides, alkaline earth bromides and ammoniun bromide. In principle, those compounds are suitable which contain the bromine as bromide or which yield bromide without difficulty, such as bromoform, allyl bromides or benzyl bromide. Generally the saltlike or organic radical in these compounds has no detectable effect on their suitability as oxidation cocatalysts, so that there is also a free choice of these compounds. Both catalyst components may also be combined in one compound as in manganese bromide or cobalt bromide.

The heavy metal component and the bromide component in the catalyst should generally be in the ratio to one another of 0.1 to 10 gram atoms of bromine to 1 gram atom of heavy metal.

0.5 to 100 g. of catalyst mixture is used as a rule per mole of starting compound to be oxidized.

Neither the values for the composition of the catalyst mixture nor the amounts thereof to be used are critical; when working outside the said limits, the oxidation reaction is merely retarded or accelerated without the nature of the reaction being changed at all.

The process may be carried out without solvents, but it is preferred to use about 2 to 60% (all percentages being by weight) solutions so that all reactants can form a homogeneous phase. In principle any liquid is suitable which resists oxidation, for example water, dimethylformamide, the majority of hydrocarbons, esters and ethers. Having regard to the solvent power both for the catalyst and the starting compound to be oxidized, however, monocarboxylic and dicarboxylic acids having up to about twenty carbon atoms such as acetic acid, propionic acid, caprylic acid and lauric acid have proved to be particularly suitable.

The preferred reaction temperatures are in the range from 50° to 150° C. As a rule conversion is adequately rapid at atmospheric pressure but the reaction may also be carried out at superatmospheric pressures up to about 150 atmospheres. In certain cases it may be advisable to carry out the reaction at subatmospheric pressure.

It is preferred to use oxygen ($O_2$) or air as the oxidizing agent.

It is advantageous to carry out the process by bringing a solution of the catalyst in the solvent to the reaction temperature, saturating it with oxygen and then introducing the compound to be oxidized while continuing the supply of oxygen. If the solvent has a higher boiling point than the starting compound and the product, both do not remain in the reaction mixture longer than is necessary for the oxidation. Using this method, the product may be distilled off immediately after its formation.

The process may be carried out continuously in the conventional way successfully and without difficulty.

The reaction mixture is worked up by a conventional method, preferably by distillation.

Ethers and esters of 4-hydroxytiglaldehyde obtainable according to the invention are valuable intermediates for organic syntheses, particularly in the field of plyenes such as carotenoids and compounds of the vitamin A series.

The invention is illustrated by the following examples.

EXAMPLE 1

A solution of 350 g. of acetic acid, 10 g. of cobalt (II) acetate tetrahydrate and 3.5 g. of barium bromide dihydrate is saturated at 100° C. and atmospheric pressure by means of a stream of oxygen (60 liters per hour). The solution takes on a very dark blue color. While continuing the stream of oxygen, 40 g. of 3-methyl-1-acetoxybut-2-ene is introduced at 110° C. over a period of thirty minutes, about 14 liters of oxygen being absorbed.

The gram atom ratio of heavy metal to bromide in the catalyst is about 1:0.7 and about 44 g. of catalyst is used for 1 mole (128 g.) of starting compound.

Conventional working up of the mixture by removal of the acetic acid, extraction of the residue with methylene chloride and fractionation of the extract gives 4-acetoxy-tiglaldehyde in a 40% yield; $n_D^{23}=1.4600$.

EXAMPLE 2

A solution of 350 g. of caprylic acid, 8 g. of manganese acetate and 5 g. of sodium bromide is saturated at 100° C. and atmospheric pressure with oxygen by means of a stream of air (100 liters per hour) and while continuing the stream of oxygen 50 g. of 3-methyl-1 acetoxybut-2-ene is introduced.

The gram atom ratio of heavy metal to bromide in the catalyst is about 1:1.6 and about 33 g. of catalyst is used per mole of starting compound.

Working up the mixture analogously to Example 1 gives 4-acetoxytiglaldehyde in a 38% yield.

We claim:

1. A process for the production of an ether or ester of 4-hydroxytiglaldehyde wherein the ether or ester radical aside from alcohol or acid oxygen atoms is a hydrocarbon radical of from 1 to 18 carbon atoms, which process comprises oxidizing the corresponding ether or ester of 3-methylbut-2-en-1-ol with oxygen or a gas containing oxygen in the presence of a catalytic amount of a catalyst containing (a) the salt of a heavy metal selected from the group consisting of vanadium, chromium, molybdenum, tungsten, manganese, iron, cobalt, tin and cerium and also containing (b) bromine or a bromine compound, said oxidation being carried out in the liquid phase and at a temperature of from 20° to 200° C.

2. A process as claimed in claim 1 wherein the catalyst contains a manganese salt as the heavy metal salt.

3. A process as claimed in claim 1 wherein the catalyst contains a cobalt salt as the heavy metal salt.

4. A process as claimed in claim 1 carried out in a homogeneous liquid phase in a solvent.

5. A process as claimed in claim 4 wherein the solvent is a monocarboxylic or dicarboxylic acid having up to twenty carbon atoms.

6. A process as claimed in claim 1 wherein the ratio of bromine component to heavy metal component in the catalyst is from 0.1:1 to 10:1.

7. A process as claimed in claim 1 wherein 0.5 to 100 grams of said catalyst is used per mole, expressed in grams, of the starting compound being oxidized.

8. A process as claimed in claim 1 carried out at from 50° to 150° C.

9. A process as claimed in claim 1 wherein the acetic acid ester of 3-methylbut-2-en-1-ol is oxidized into the acetic acid ester of 4-hydrotiglaldehyde.

10. A process as claimed in claim 9 wherein the heavy metal of the catalyst is selected from the group consisting of manganese and cobalt.

References Cited

FOREIGN PATENTS 736,488    9/1955    Great Britain.

LORRAINE A. WEINBERGER, Primary Examiner

V. GARNER, Assistant Examiner

U.S. Cl. X.R.

260—410.9 N, 468 R, 469, 599, 602